Figures 1, 2:
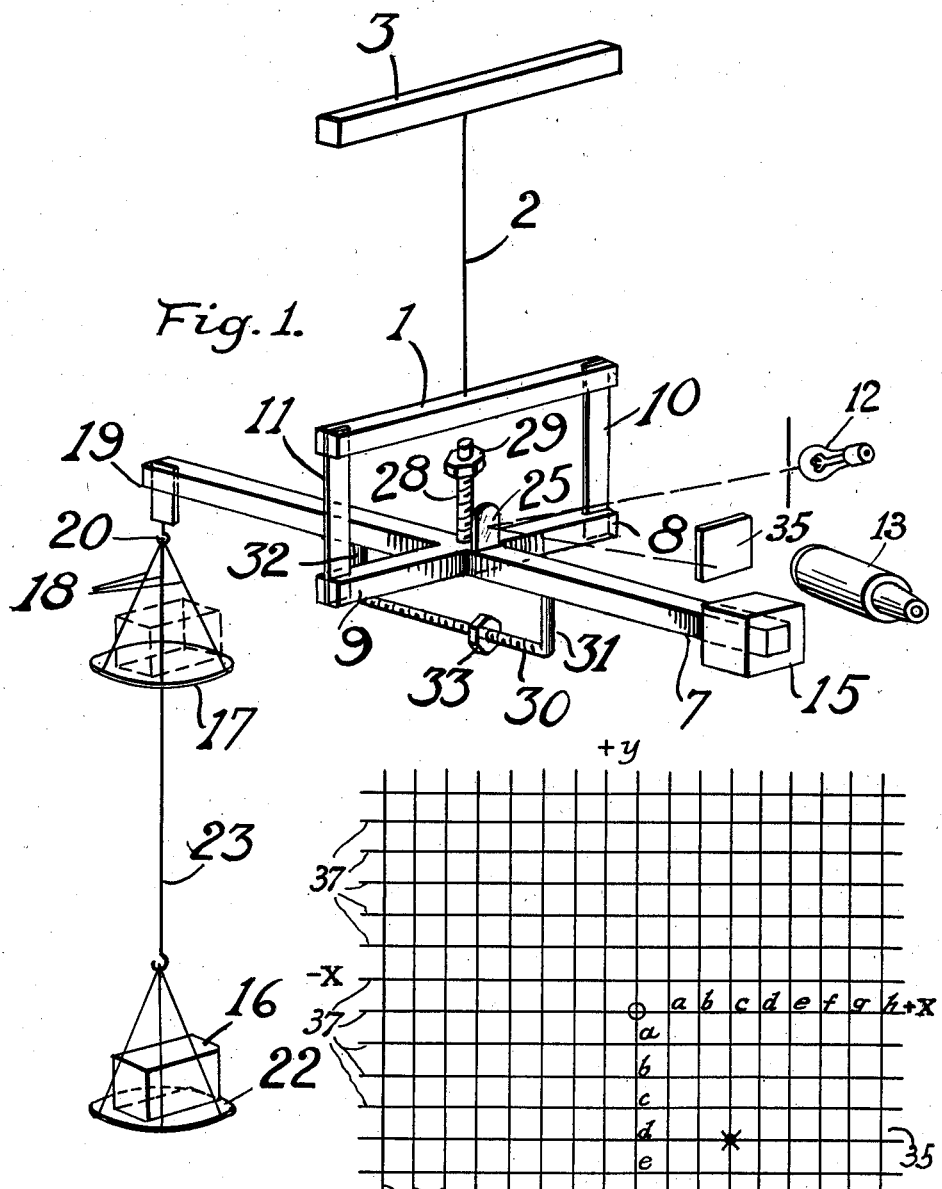

Jan. 2, 1940. L. W. BLAU 2,185,582

MULTIPLE COMPONENT GRAVITY BALANCE

Filed Aug. 29, 1935

Ludwig W. Blau Inventor

By P. L. Young Attorney

Patented Jan. 2, 1940

2,185,582

UNITED STATES PATENT OFFICE 2,185,582

MULTIPLE COMPONENT GRAVITY BALANCE

Ludwig W. Blau, Houston, Tex., assignor to Standard Oil Development Company, a corporation of Delaware Application August 29, 1935, Serial No. 38,350

7 Claims. (Cl. 265—1.5)

This invention relates to improvements in a gravity balance operable to give increased or complete information about the gravitational field at the place of observation.

The torsion balance as previously constructed for use in geophysical prospecting consists of a beam, light in weight, which is suspended from the top of the torsion balance case by a thin wire called the torsion wire. A weight is attached directly to one end of the beam and an equal weight is suspended from the other end of the beam. As is well known by those familiar with the art, such a torsion balance permits of the determination of the following quantities:

$$\frac{\partial^2 u}{\partial y^2} - \frac{\partial^2 u}{\partial x^2}, \frac{\partial^2 u}{\partial x \partial y}, \frac{\partial^2 u}{\partial x \partial z}, \frac{\partial^2 u}{\partial y \partial z}$$

Here $u$ is the potential and $x$, $y$ and $z$ rectangular coordinates. To determine the field completely in practice, it is necessary to know the following quantities:

$$\frac{\partial^2 u}{\partial x^2}, \frac{\partial^2 u}{\partial y^2}, \frac{\partial^2 u}{\partial z^2}, \frac{\partial^2 u}{\partial x \partial y}, \frac{\partial^2 u}{\partial x \partial z}, \frac{\partial^2 u}{\partial y \partial z}$$

It is an object of the present invention to provide an instrument which will permit of the determination of all of these quantities. It is a further object of this invention to provide an instrument which will permit of the determination of the vertical gradient $$\frac{\partial^2 u}{\partial z^2}$$

Other objects will be apparent from the specification taken in connection with the accompanying drawing, in which latter—

Fig. 1 is a perspective view of a preferred form of general torsion balance which is free to oscillate in a vertical and in a horizontal plane and which will give complete information about the gravitational field at the point of observation, and Fig. 2 is a diagrammatic illustration of a grid suitable for observing the deflections of the gravity balance illustrated in Fig. 1.

Referring particularly to Fig. 1, the vibration system of a general torsion balance comprises a bar 1 suspended by a filament or torsion wire 2 from a suitable support 3 such as the case of the instrument. The bar 1 is suspended by the filament in horizontal position.

A beam 7 is suspended from the bar 1 horizontally and substantially at right angles to the bar 1, as follows. The beam 7 is provided with arms 8 and 9 which protrude horizontally from an intermediate portion of the beam 7. The arms 8 and 9 are suspended from the bar 1 by means of filaments 10 and 11 respectively. In the embodiment illustrated, the filaments are constituted by metallic ribbons. Alternatively, the filaments may be made of wire or the like and some of the advantages of the invention will be retained. The metallic ribbons 10 and 11 suspend the arms 8 and 9 from the ends of the bar 1, being connected to the bar 1 on opposite sides of the connection of the torsion wire 2 to the bar 1. The torsion balance beam 7 is preferably made of a light metal.

The torsion balance beam 7 is weighted as follows. A weight 15 is supported directly by one end of the balance beam 7. Means are provided for suspending a second weight 16 at varying distances vertically from the other end of the balance beam 7, whereby vertical and horizontal deflections of the balance beam due to variations in gravity are effected. In the embodiment illustrated, a scale pan 17 is suspended by filaments 18 directly near the end 19 of the balance beam by means of a hook 20. A second scale pan 22 is suspended beneath the scale pan 17 by means of a filament 23 attached directly to the hook 20. In the preferred embodiment the scale pan 22 is disposed approximately 50 cm. below the scale pan 17. In operation of the device, readings are taken with the weight 16 supported by the scale pans 22 and 17 successively. Alternatively, the scale pan 22 can be suspended by a suitable hook attached directly to the bottom of the scale pan 17.

Readings of the deflection of the balance beam 7 are taken by means of a mirror 25. The mirror 25 is secured to the beam 7 near the middle of the beam with the plane of its reflecting surface parallel to the longitudinal axis of the arms 8 and 9. A beam of light from a source 12 is directed against the mirror 25 and is reflected from the mirror through a screen 35 to be hereinafter described into a telescope 13 in the familiar manner for reading oscillations of a torsion balance beam.

Means are provided for effecting vertical adjustment of the center of gravity of the system by a screw 28 which extends vertically upwardly from the balance beam 7 at the juncture of the arms 8 and 9 with the balance beam. A nut 29 is adjustably carried by the screw 28. Adjustment of the center of gravity of the system horizontally is effected by means of a horizontally disposed screw 30 which is secured to the under side of the balance beam 7 by links 31 and 32 which depend from the balance beam 7 on opposite sides of the arms 8 and 9. A nut 33 is threaded on the screw 30 for adjustable movement.

The instrument as above described can be used to determine $R_1$, $R_2$, $\psi_1$, and $\psi_2$ where $R_1$ and $R_2$ are the principal radii of curvature (respectively, maximum and minimum) and $\psi_1$ and $\psi_2$ are respectively the angles the corresponding principal directions make with the positive $x$-axis.

General torsion balance is operated as follows. After the instrument has been set up and with the weight 16 in its lower position it is allowed to come to rest. A reading of the position of the beam 7 is taken. Since the beam can rotate in two planes, it is necessary to observe the deflection on a grid instead of on a scale as is usually done. Such a grid is illustrated in Fig. 2 in which reference numeral 35 designates a glass plate upon which are ruled perpendicular lines 36 and 37. The glass plate 35 is placed in the focal plane of the eye-piece of a telescope (not shown) in the usual manner. One of the lines 37 is selected as the $x$—$x$ axis and one of the lines 36 is selected as the $y$—$y$ axis, as indicated in Fig. 2. The lines 37 beneath the $x$—$x$ axis may be regarded as negative and the lines 37 above the $x$—$x$ axis may be regarded as positive. The lines 36 to the left of the axis $y$—$y$, as viewed in Fig. 2, may be regarded as negative and the lines 36 to the right of the axis $y$—$y$ may be regarded as positive. The lines 36 and 37 may be designated $a$, $b$, $c$, etc., from the 0 position on their respective axes. The reading of the first position of the beam of light may be $(c, -d)$ indicated by the dot on Fig. 2. The balance is then rotated through an angle of 72 degrees in a horizontal plane and another reading is taken. A third reading is taken after a further rotation of 72 degrees. A fourth reading is taken after a further rotation of 72 degrees. A fifth reading is taken after the rotation of another 72 degrees.

A further series of readings is taken with the weight 16 in its high position. The weight 16 is disposed in the pan 17 and after the system has come to rest another observation is made. The balance is then rotated again through 72 degrees. It is then on the same position as it was when the first reading was taken, but since the weight 16 is disposed in its high position a different reading will be obtained. Further readings are taken after the balance has been successively rotated through 72 degrees, 144 degrees, 216 degrees and 288 degrees. Thus readings are obtained at 0 degrees, 72 degrees, 144 degrees, 216 degrees and 288 degrees, first with the weight 16 at the lower position and next with the weight 16 raised to its high position. At each position a horizontal and a vertical deflection are obtained. In the case given above, and recorded on the plate in Fig. 2, the horizontal deflection was three scale divisions, while the vertical deflection was minus four scale divisions. These readings provide more data than are necessary for the unique determination of the quantities, $$\frac{\partial^2 u}{\partial x^2}, \frac{\partial^2 u}{\partial y^2}, \frac{\partial^2 u}{\partial z^2}, \frac{\partial^2 u}{\partial x \partial y}, \frac{\partial^2 u}{\partial x \partial z}, \frac{\partial^2 u}{\partial y \partial z}$$

One uses the relation $$\frac{\partial^2 u}{\partial x^2} + \frac{\partial^2 u}{\partial y^2} + \frac{\partial^2 u}{\partial z^2} = 2w^2$$

where $w$ is the speed of rotation of the earth. It is seen that whereas the previously known horizontal torsion balance furnishes only the quantities $$\frac{\partial^2 u}{\partial y^2} - \frac{\partial^2 u}{\partial x^2}, \frac{\partial^2 u}{\partial x \partial y}, \frac{\partial^2 u}{\partial x \partial z}, \frac{\partial^2 u}{\partial y \partial z}$$

which are not sufficient to enable one to map the gravitation surface at the point of observation, the general torsion balance of this invention furnishes each quantity uniquely. It will be obvious to those familiar with the art that the quantity $$\frac{\partial^2 u}{\partial z^2}$$

which is the vertical component of the gravity gradient is a very important one and one which it has been impossible to measure up to the present time with a portable instrument. Also, the torsion balance previously used furnishes only $$\frac{\partial^2 u}{\partial y^2} - \frac{\partial^2 u}{\partial x^2}$$

which is proportional to the differences between the curvatures of the gravitational surfaces. On the other hand, the general torsion balance of this invention furnishes the principal curvatures uniquely.

Various changes and alternate arrangements may be made within the scope of the appended claims, in which it is my intention to claim all novelty inherent in the art as broadly as the prior art permits.

I claim:

1. A gravity balance, comprising a beam, a weight secured directly to one end of the beam, a weight suspended from the other end of the beam, and a suspension system for the beam comprising shoulders protruding laterally from the beam, a bar disposed above the shoulders suspending the shoulders by spaced filaments whereby vertical deflection of the beam is permitted, and a filament attached to an intermediate portion of the bar suspending the bar in a horizontal position whereby horizontal deflection of the beam is permitted.

2. In a gravity balance, a support, a bar, a filament suspending the bar from the support in horizontal position, a beam having arms protruding horizontally from an intermediate portion of the beam, filaments connected to the arms from opposite ends of the bar to suspend the beam at right angles to the bar, and means for adjusting the center of gravity of the beam vertically and horizontally.

3. In a gravity balance, a support, a bar, a filament suspending the bar from the support in horizontal position, a beam having arms protruding horizontally from an intermediate portion of the beam, filaments connected to the arms from opposite ends of the bar to suspend the beam horizontally at right angles to the bar, a weight supported directly by one end of the beam, a second weight, and means for suspending the second weight at varying distances vertically from the opposite end of the beam whereby vertical and horizontal deflections of the beam due to variations in gravity are effected.

4. A gravity balance, comprising a support, a bar, a filament, suspending the bar from the support in horizontal position, a beam assembly, and means for applying forces to the beam assembly, filaments spaced longitudinally of the bar connected to an intermediate portion of the beam assembly suspending the assembly from the bar with the beam extending at substantially right-angles to the bar whereby the assembly oscillates, and vertical and horizontal gradients and the difference between principal curvatures of the earth's gravitational field at a point are measured.

bar, a filament suspending the bar from the support in horizontal position, a beam assembly, means for applying forces to the beam assembly, filaments spaced longitudinally of the bar and connected to laterally spaced intermediate portions of the beam assembly suspending the assembly horizontally with the beam at right-angles to the bar whereby the assembly oscillates, and vertical and horizontal gradients and the difference between principal curvatures of the earth's gravitational field at a location are measured, and an auxiliary weight associated with and spaced from the horizontal plane of the beam assembly whereby oscillation of the assembly is amplified.

6. A gravity balance comprising a support, a bar, a filament suspending the bar from the support in position for oscillation about a vertical axis, a beam supported by said bar in position for oscillation about a horizontal axis and means for applying a vertically acting force on each side of the horizontal axis of said beam whereby the assembly oscillates in response to both horizontal and vertical changes in gravity.

7. A gravity balance comprising a support, a bar, a filament suspending the bar from the support in position for oscillation about a vertical axis, a beam supported by said bar for oscillation therewith and for independent oscillation about its own transverse horizontal axis, means for applying a vertically acting force to said beam on each side of said transverse horizontal axis whereby the assembly oscillates in response to both horizontal and vertical forces of changes in gravity, and means carried by the assembly for reflecting the resultant of such changes.

LUDWIG W. BLAU.